United States Patent
Kwon et al.

(10) Patent No.: US 9,673,485 B2
(45) Date of Patent: *Jun. 6, 2017

(54) ANODE OF CABLE-TYPE SECONDARY BATTERY AND MANUFACTURING METHOD THEREOF

(75) Inventors: Yo-Han Kwon, Daejeon (KR); Je-Young Kim, Daejeon (KR); Heon-Cheol Shin, Busan (KR); Ki-Tae Kim, Daejeon (KR); Sang-Young Lee, Gangwon-do (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/399,614

(22) Filed: Feb. 17, 2012

(65) Prior Publication Data

US 2012/0148918 A1 Jun. 14, 2012

Related U.S. Application Data

(63) Continuation of application No. PCT/KR2011/007625, filed on Oct. 13, 2011.

(30) Foreign Application Priority Data

Oct. 19, 2010 (KR) .................. 10-2010-0101862

(51) Int. Cl.
*H01M 10/058* (2010.01)
*H01M 4/66* (2006.01)
(Continued)

(52) U.S. Cl.
CPC ....... *H01M 10/058* (2013.01); *H01M 4/0416* (2013.01); *H01M 4/0438* (2013.01);
(Continued)

(58) Field of Classification Search
CPC .............................................. H01M 2004/021
USPC ......................... 429/127, 140, 235–237, 161
See application file for complete search history.

(56) References Cited

U.S. PATENT DOCUMENTS 6,579,649 B2 * 6/2003 Tsutsue et al. ............... 429/309
2002/0006548 A1 1/2002 Tsutsue et al.
(Continued)

FOREIGN PATENT DOCUMENTS

EP 2 573 848 A2 3/2013
EP 2 587 562 A2 5/2013
(Continued)

*Primary Examiner* — Barbara Gilliam
*Assistant Examiner* — Robert S Carrico
(74) *Attorney, Agent, or Firm* — Birch, Stewart, Kolasch & Birch, LLP

(57) ABSTRACT

Provided is a method for manufacturing an anode of a cable-type secondary battery having a solid electrolyte layer, including preparing an aqueous solution of an anode active material, making an anode by immersing a core as a current collector having a horizontal cross section of a predetermined shape and extending longitudinally in the aqueous solution, then applying an electric current to form a porous shell of the anode active material on the surface of the core, and forming a solid electrolyte layer on the surface of the anode by passing the anode through a solid electrolyte solution. The anode has a high contact area to increase the mobility of lithium ions, thereby improving battery performance. Also, the anode is capable of relieving stress and pressure in the battery, such as volume expansion during charging and discharging, thereby preventing battery deformation and ensuring battery stability.

16 Claims, 4 Drawing Sheets

(51) Int. Cl.
  *H01M 4/04* (2006.01)
  *H01M 4/1395* (2010.01)
  *H01M 4/70* (2006.01)
  *H01M 10/0565* (2010.01)
  *H01M 10/0568* (2010.01)
  *H01M 10/052* (2010.01)
  *H01M 4/02* (2006.01)

(52) U.S. Cl.
  CPC ....... *H01M 4/0452* (2013.01); *H01M 4/0469* (2013.01); *H01M 4/1395* (2013.01); *H01M 4/661* (2013.01); *H01M 4/667* (2013.01); *H01M 4/668* (2013.01); *H01M 4/70* (2013.01); *H01M 10/0565* (2013.01); *H01M 10/0568* (2013.01); *H01M 10/052* (2013.01); *H01M 2004/025* (2013.01); *H01M 2004/027* (2013.01)

(56) References Cited

U.S. PATENT DOCUMENTS

| | | |
|---|---|---|
| 2004/0214085 A1 | 10/2004 | Sheem et al. |
| 2005/0084760 A1* | 4/2005 | Hwang et al. ................ 429/234 |
| 2010/0015514 A1* | 1/2010 | Miyagi et al. ................ 429/129 |
| 2010/0203372 A1 | 8/2010 | Kim et al. |
| 2011/0274954 A1* | 11/2011 | Cho et al. ................ 429/94 |

FOREIGN PATENT DOCUMENTS

| | | |
|---|---|---|
| EP | 2 610 956 A2 | 7/2013 |
| JP | 57-88669 | 6/1962 |
| JP | 4-169066 | 6/1992 |
| JP | 2001-110445 | 4/2001 |
| JP | 2004-139768 | 5/2004 |
| JP | 2006260886 A * | 9/2006 |
| JP | 2007-087789 | 4/2007 |
| JP | 2010-073533 | 4/2010 |
| JP | 2010-185870 | 7/2010 |
| KP | 10-0804411 B2 | 2/2008 |
| KR | 10-2004-0063802 | 7/2004 |
| KR | 10-2005-0030438 | 3/2005 |
| KR | 10-20050099903 | 10/2005 |
| KR | 10-2007-0009231 A | 1/2007 |
| KR | 10-2007-0075928 A | 7/2007 |
| KR | 10-2009-0009598 A | 7/2007 |
| WO | WO 2005/098994 A1 | 10/2005 |
| WO | WO 2010/076975 A2 | 7/2010 |
| WO | WO 2010076975 A2 * | 7/2010 |

* cited by examiner

ANODE OF CABLE-TYPE SECONDARY BATTERY AND MANUFACTURING METHOD THEREOF

CROSS-REFERENCE TO RELATED APPLICATION(S)

This application is a continuation of International Application No. PCT/KR2011/007625 filed on Oct. 13, 2011, which claims priority from Korean Patent Application No. 10-2010-0101862 filed in the Republic of Korea on Oct. 19, 2010, the entire contents of which are incorporated herein by reference.

BACKGROUND

Field

The present invention relates to a method for manufacturing an anode suitable for a cable-type secondary battery and a cable-type secondary battery comprising the same.

Description of Related Art

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are adaptable in shape. To fulfill this need, suggestions have been made to develop flexible linear secondary batteries having a very high ratio of length to cross-sectional diameter, hereinafter referred to as cable-type secondary batteries.

However, the flexible cable-type secondary batteries are frequently subject to the external physical impact due to their structural characteristics, which may result in a short circuit. Further, when Si or Sn is used as an anode active material, the active material may fall off due to expansion and shrinkage of electrodes caused by the repeated charging and discharging. For this reason, the performance of the cable-type secondary batteries may deteriorate more severely than general secondary batteries.

Accordingly, it is an object of the present invention to provide an anode of a lithium secondary battery having a pore structure that is excellent in electrochemical reactivity and capable of relieving the stress and pressure in the battery, and a method for manufacturing the same.

DISCLOSURE

A method for manufacturing an anode of a cable-type secondary battery having a solid electrolyte layer may include preparing an aqueous solution of an anode active material, making an anode by immersing a core as a current collector having a horizontal cross section of a predetermined shape and extending longitudinally in the aqueous solution, then applying an electric current to form a porous shell of the anode active material on the surface of the core, and forming a solid electrolyte layer on the surface of the anode by passing the anode through a solid electrolyte solution.

The anode active material may include any one selected from the group consisting of Si, Sn, Li, Zn, Mg, Cd, Ce, Ni, Fe and oxide thereof, or mixtures thereof.

The current collector may be made from stainless steel, aluminum, titanium, silver, palladium, nickel, copper, or stainless steel surface-treated with titanium, silver, palladium, nickel, or copper.

Also, the current collector may have a polymer core and a metal coating layer formed on the surface of the polymer core.

Preferably, the polymer core is formed from any one polymer selected from the group consisting of polyacetylene, polyaniline, polypyrrole, polythiophene, polysulfur nitride, polyethylene (PE), polypropylene (PP), polyvinyl chloride (PVC), polyvinyl alcohol (PVA), polyacrylate, and polytetrafluoroethylene (PTFE), or mixtures thereof, and the metal coating layer is formed from any one metal selected from the group consisting of silver, palladium, nickel, and copper, or mixtures thereof.

The solid electrolyte may be any one selected from the group consisting of a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc), a solid polymer electrolyte of PEO, polypropylene oxide (PPO), polyethylene imine (PEI), polyethylene sulphide (PES), or PVAc, and a plastic crystal electrolyte of succinonitrile.

Preferably, the solid electrolyte solution further includes a lithium salt, and the lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, or tetra phenyl lithium borate.

Also, an anode of a cable-type secondary battery according to the present invention may include a core as a current collector having a horizontal cross section of a predetermined shape and extending longitudinally, a porous shell formed by coating the surface of the core with an anode active material, and a solid electrolyte layer formed by filling the pores of the porous shell with a solid electrolyte.

Preferably, the porous shell has a pore size of 10 to 150 μm and a porosity of 60 to 95%. Also, the porous shell preferably has a surface area of $8 \times 10^4$ to $5 \times 10^5$ cm$^2$/g.

The porous anode of the present invention may be used in a lithium secondary battery, particularly a cable-type secondary battery.

DESCRIPTION OF DRAWINGS

The accompanying drawing illustrates a preferred embodiment of the present disclosure and, together with the foregoing disclosure, serves to provide further understanding of the technical spirit of the present disclosure. However, the present disclosure is not to be construed as being limited to the drawings.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
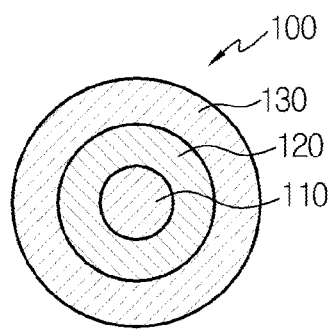
FIG. 1 is a cross-sectional view illustrating a porous anode having a core as a current collector and a solid electrolyte layer formed on the surface of the core.

FIG. 1 schematically illustrates a porous anode having a solid electrolyte layer according to an embodiment of the present invention. Although a few exemplary embodiments of the present invention are shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The anode 100 of the present invention may include a core 110 serving as a current collector having a horizontal cross section of a predetermined shape and extending longitudinally, a porous shell 120 formed by coating the outer surface of the core 110 with an anode active material, and a solid electrolyte layer 130 formed on the outer surface of the anode 100. Here, the predetermined shape is not limited to a specific shape, and may include any shape without departing from the spirit and scope of the present invention. For example, the horizontal cross section of the current collector 110 may have a circular shape or a polygonal shape, wherein the circular shape may include a circular shape of geometrical symmetry or an oval shape of geometrical asymmetry, and the polygonal shape may include, but is not limited to, a triangular, square, pentagonal, or hexagonal shape.

The porous shell 120 or the porous anode active material layer may be formed on the surface of the current collector 110 using an electroplating process or an anodic oxidation process. The anode active material may include any one selected from the group consisting of Si, Sn, Li, Zn, Mg, Cd, Ce, Ni, Fe and oxide thereof, or mixtures thereof.

When an electroplating process is used in forming the active material layer on the surface of the current collector, hydrogen bubbles may be generated. It is possible to form an active material layer of a three-dimensional pore structure having a desired pore size by adjusting the amount generated and the size of the hydrogen bubbles.

An anodic oxidation process may be used in forming a metal oxide-based active material layer on the surface of the current collector. In this case, it is possible to form a metal oxide-based active material layer of a one-dimensional channel-shaped pore structure by adjusting the amount generated and the size of oxygen bubbles that may be generated under anodic oxidation conditions.

The porous shell 120 may have a pore size of 10 to 150 μm. Also, the porous shell 120 may have a porosity of 60 to 95% and a surface area of $8 \times 10^4$ to $5 \times 10^5$ cm$^2$/g.

The solid electrolyte layer 130 may be formed on the outer surface of the anode 100. The solid electrolyte may be a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc), a solid polymer electrolyte of PEO, polypropylene oxide (PPO), polyethylene imine (PEI), polyethylene sulphide (PES), or PVAc, or a plastic crystal electrolyte of succinonitrile.

A method for manufacturing the anode 100 of the present invention, including the core 110 as a current collector having a horizontal cross section of a predetermined shape and extending longitudinally, the porous shell 120 formed by coating the outer surface of the core 110 with an anode active material, and the solid electrolyte layer 130 formed on the outer surface of the anode 100, may be as follows:

First, an aqueous solution of an anode active material is prepared. (S1)

The aqueous solution of the anode active material is prepared by dissolving an anode active material in an aqueous acid solution. In this instance, a precursor existing in an acid salt form is primarily used for the anode active material. The anode active material may be Si, Sn, Li, Zn, Mg, Cd, Ce, Ni or Fe, preferably Si or Sn.

Next, the core serving as a current collector having a horizontal cross section of a predetermined shape and extending longitudinally is immersed in the aqueous solution of the anode active material, followed by the application of an electric current, to form the porous shell on the outer surface of the core. (S2)

For electroplating, the core as a current collector is put in a beaker containing the aqueous solution of the anode active material where an anode and a cathode are placed. An electric current is applied for a predetermined time, so that the anode active material is deposited onto the surface of the core, resulting in the anode active material layer or the shell. When the anode active material layer is formed, hydrogen gas is generated in the core to make the anode active material layer porous.

Generally, the secondary battery swells due to the repeated expansion and shrinkage during charging and discharging. The swelling becomes even more severe when Sn or Si is used as an anode active material. This volume change causes the active material to fall off or deteriorate, and provokes a side reaction which leads to a reduction in the performance of the battery. However, the active material layer of the present invention has a pore structure to relieve the volume change and consequently to prevent the problems caused by the volume change. Also, the porous active material layer increases the surface area of the anode contacting an electrolyte, which makes lithium ions move fast and smoothly, thereby making it advantageous in an electrochemical reaction, which improves the performance of the battery.

Optionally, washing may be performed to prevent a side reaction caused by the aqueous solution of the anode active material remaining in the porous shell.

Next, the electrolyte layer is formed on the surface of the anode by passing the anode through the solid electrolyte solution. (S3)

The porous shell of the anode of the present invention has high porosity but low hardness, and thus is apt to break during the fabrication of the battery. The manufacturing method of the present invention includes coating the surface of the porous shell with a solid electrolyte in a continuous manner when forming the porous shell. The resulting solid electrolyte layer can protect the porous shell and minimize the likelihood that the porous shell will break during the fabrication of the battery.

The solid electrolyte solution may be prepared by dissolving a solid electrolyte in a solvent or by dissolving polymerizable polymer monomers or polymer oligomers of a solid electrolyte in a solvent.

Thereafter, drying may be performed as post-processing to remove the solvent. Particularly, when the solid electrolyte solution contains polymer monomers or polymer oligomers, ultraviolet (UV) radiation or heating may be further performed for polymerization of the solid electrolyte. Also, the solid electrolyte solution may further contain an additive such as a cross-linking agent.

The wire-type current collector 110 of the present invention may be made from stainless steel, aluminum, nickel, titanium, sintered carbon, or copper; stainless steel surface-treated with carbon, nickel, titanium, or silver; aluminum-cadmium alloys; polyacetylene, polyaniline, polypyrrole, polythiophene, or polysulfur nitride.

Figure 2:
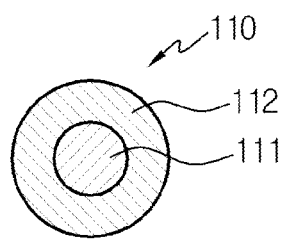
FIG. 2 is a cross-sectional view illustrating a current collector having a polymer core and a metal coating layer formed on the surface of the polymer core.

Referring to FIG. 2, the wire-type current collector 110 preferably has a polymer core 111 and a metal coating layer 112 formed on the surface of the polymer core 111, in particular, to ensure the flexibility of the cable-type secondary battery.

The polymer core 111 may be made from polyacetylene, polyaniline, polypyrrole, polythiophene, polysulfur nitride, polyethylene (PE), polypropylene (PP), polyvinyl chloride (PVC), polyvinyl alcohol (PVA), polyacrylate, or polytetrafluoroethylene (PTFE). The metal coating layer 112 may be formed from any one metal selected from the group consisting of silver, palladium, nickel and copper, or mixtures thereof.

The anode of the present invention forms an electrode assembly with a cathode and is used in a lithium secondary battery. The cathode is not specially limited, and any typical cathode used in fabricating a lithium secondary battery may be used.

Specifically, a cathode active material usable in the present invention preferably is lithium-containing transition metal oxide, for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2(0\leq y<1)$, $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, and $LiFePO_4$, or mixtures thereof. Also, lithium-containing transition metal sulfide, selenide, or halide may be used as well as the lithium-containing transition metal oxide.

The prevent invention provides an anode of a cable-type secondary battery including the core serving as a current collector having a horizontal cross section of a predetermined shape and extending longitudinally, the porous shell formed by coating the outer surface of the core with an anode active material, and the solid electrolyte layer formed by filling the pores of the porous shell with a solid electrolyte.

According to the present invention, the solid electrolyte permeates into the pores of the porous shell formed from the anode active material. Thus, an area in contact with the solid electrolyte may increase, and consequently, the mobility of lithium ions may increase, thereby improving the ionic conductivity and the performance of the battery. Also, the brittle porous shell may be physically protected.

Preferably, the porous shell has a pore size of 10 to 150 μm. Also, the porous shell preferably has a porosity of 60 to 95% and a surface area of $8\times10^4$ to $5\times10^5$ cd/g.

The porous anode of the present invention may be used in a lithium secondary battery, in particular, a cable-type secondary battery.

Hereinafter, a cable-type secondary battery comprising the anode of the present invention is briefly described with reference to FIG. 7 below.

Figure 7:
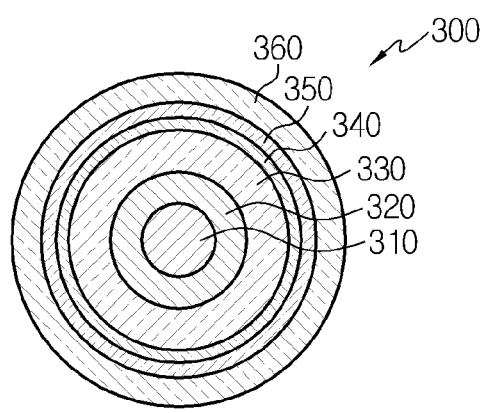
FIG. 7 is a cross-sectional view illustrating a cable-type secondary battery with a porous anode having a solid electrolyte layer according to an embodiment of the present invention.

Referring to FIG. 7, a cable-type secondary battery 300 comprising a porous anode having a solid electrolyte layer according to an embodiment of the present invention may include an anode arranged in parallel including an anode current collector 310 having a horizontal cross section of a predetermined shape and an anode active material 320 applied to the anode current collector 310, an electrolyte layer 330 surrounding the anode and serving as an ion channel, a cathode including a pipe-type current collector 350 having a horizontal cross section of a predetermined shape surrounding the electrolyte layer 330 and a cathode active material 340 applied to the cathode current collector 350, and a protection coating 360 surrounding the cathode.

The protection coating 360 is formed on the outermost surface of the battery 300 and acts as an insulator to protect the electrode from moisture in the air or from external impact. The protection coating 360 may be formed from typical polymer resins, for example, PVC, high-density polyethylene (HDPE), or epoxy resin.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLE

Example 1: Manufacture of Wire-Type Porous Anode

Figure 3:
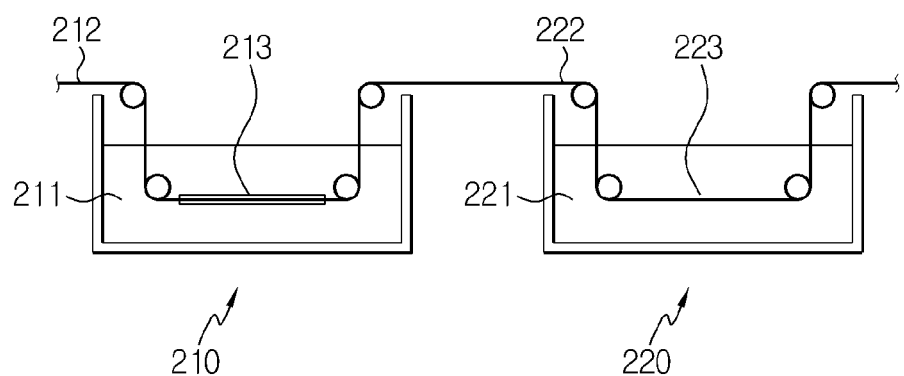
FIG. 3 is a diagram illustrating a method for manufacturing a porous anode having a solid electrolyte layer.

A method for manufacturing a wire-type porous anode is described with reference to FIG. 3.

A wire-type copper current collector 212 was washed with acetone and diluted hydrochloric acid. As an aqueous solution of an anode active material 211, a mixed solution of 0.15 M $SnSO_4$ and 1.5 M $H_2SO_4$ was prepared in a first bath 210.

In this instance, a platinum anode was used, and the copper current collector 212 was used as a cathode. The copper current collector 212 was electroplated while passing through the first bath 210 at a predetermined rate in the presence of an electric current of 3 A/cm$^2$ or more. Tin (Sn) was deposited onto the copper current collector 212, so that a wire-type porous anode 222 was manufactured.

To form a solid electrolyte layer, a solid electrolyte solution 221 was prepared in a second bath 220 as follows: 50 parts by weight of succinonitrile, 15 parts by weight of polyethylene oxide, and 35 parts by weight of polyethylene glycol dimethacrylate (PEGDMA) having a molecular weight of 400 g/mol were mixed. Next, lithium bis-trifluoromethane sulfonylimide was added, followed by uniform mixing, and a mole ratio of lithium bis-trifluoromethane sulfonylimide to ethylene oxide of the PEGDMA was 1:8. Also, 3 w % of benzoin as a UV initiator was added per the weight of the PEGDMA. In this way, the preparation of the solid electrolyte solution 221 was completed.

The wire-type porous anode 222 was passed through the second bath 220 containing the solid electrolyte solution 221, so that the wire-type porous anode 222 was coated with the solid electrolyte solution 221, followed by UV radiation, to form a solid electrolyte layer on the surface of the porous anode 222.

Experimental Example 1: Pore Structure of Porous Anode

Figure 4:
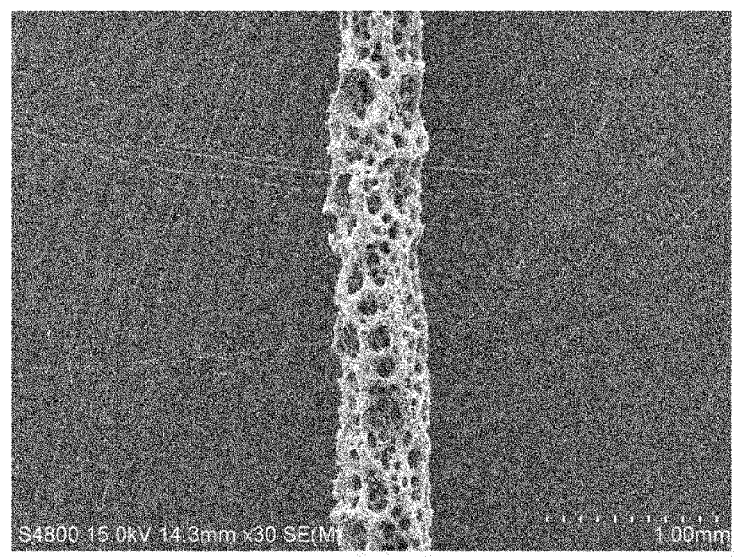
FIG. 4 is a scanning electron microscopy (SEM) image illustrating a porous anode according to Example 1.
Figure 5:
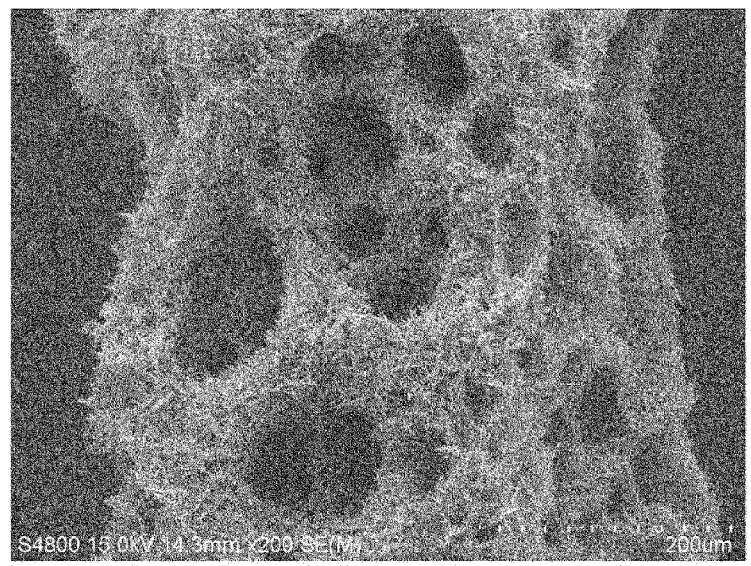
FIG. 5 is an enlarged SEM image illustrating a porous anode according to Example 1.

FIGS. 4 and 5 illustrate SEM images of the porous anode manufactured according to Example 1. As shown in FIG. 4, it can be determined that an Sn-based anode active material layer of a three-dimensional pore structure was formed on the surface of a copper current collector.

Figure 6:
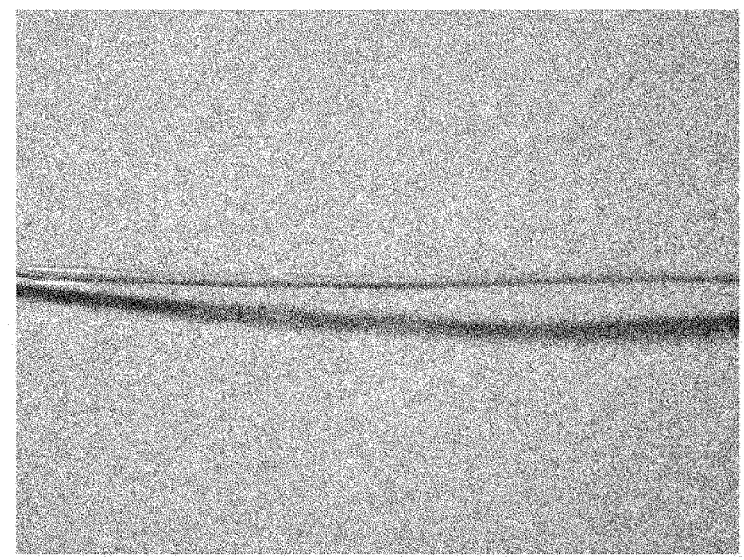
FIG. 6 is a photo illustrating a porous anode having a solid electrolyte layer according to an embodiment of the present invention.

FIG. 6 is a photo of a porous anode having a solid electrolyte layer.

According to teachings above, the anode manufactured by the manufacturing method of the present invention is capable of absorbing shocks due to its pore structure, and thus is resistant to external physical impact such as warping, thereby preventing a short circuit. Also, when Si or Sn is used as an anode active material, the anode is capable of relieving the stress and pressure in the battery such as volume expansion that may occur during charging and discharging, thereby preventing the deformation of the battery and ensuring the stability of the battery.

Also, the anode manufactured by the manufacturing method of the present invention has a porous shell and consequently a high surface area, thereby increasing an area in contact with an electrolyte, particularly a solid electrolyte. As a result, the mobility of lithium ions may increase, thereby improving the ionic conductivity and the performance of the battery.

The porous shell of the anode of the present invention has high porosity but low hardness, and thus is apt to break during the fabrication of the battery. The manufacturing method of the present invention includes coating the surface of the porous shell with the solid electrolyte in a continuous manner when forming the porous shell. The resulting solid electrolyte layer can protect the porous shell and minimize the likelihood of the porous shell breaking.

What is claimed is:

1. A method for manufacturing an anode of a cable secondary battery having a solid electrolyte layer, the method comprising:

preparing an aqueous solution of an anode active material;

making an anode by immersing a current collector having a horizontal cross section of a predetermined shape and extending longitudinally in the aqueous solution, said current collector comprising a polymer core and a metal coating layer formed on a surface of the polymer core, then applying an electric current to form a porous shell of the anode active material on a surface of the current collector; and forming a solid electrolyte layer on a surface of the anode by passing the anode through a solid electrolyte solution, wherein pores of the porous shell are filled with a solid electrolyte, wherein the porous shell has a pore size of 10 to 150 μm, and wherein the porous shell has a porosity more than 60% and no more than 95%.

2. The method for manufacturing an anode of a cable secondary battery according to claim 1, wherein the aqueous solution of the anode active material includes any one selected from the group consisting of Si, Sn, Li, Zn, Mg, Cd, Ce, Ni, Fe and oxide thereof, or mixtures thereof.

3. The method for manufacturing an anode of a cable secondary battery according to claim 1, wherein the current collector is made from stainless steel, aluminum, titanium, silver, palladium, nickel, copper, or stainless steel surface-treated with titanium, silver, palladium, nickel, or copper.

4. The method for manufacturing an anode of a cable secondary battery according to claim 1, wherein the polymer core is formed from any one polymer selected from the group consisting of polyacetylene, polyaniline, polypyrrole, polythiophene, polysulfur nitride, polyethylene (PE), polypropylene (PP), polyvinyl chloride (PVC), polyvinyl alcohol (PVA), polyacrylate, and polytetrafluoroethylene (PTFE), or mixtures thereof.

5. The method for manufacturing an anode of a cable secondary battery according to claim 1, wherein the metal coating layer is formed from any one metal selected from the group consisting of silver, palladium, nickel, and copper, or mixtures thereof.

6. The method for manufacturing an anode of a cable secondary battery according to claim 1, wherein the solid electrolyte solution includes any one electrolyte selected from the group consisting of a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc), a solid polymer electrolyte of PEO, polypropylene oxide (PPO), polyethylene imine (PEI), polyethylene sulphide (PES), or PVAc, and a plastic crystal electrolyte of succinonitrile.

7. The method for manufacturing an anode of a cable secondary battery according to claim 1, wherein the solid electrolyte solution further includes a lithium salt.

8. The method for manufacturing an anode of a cable secondary battery according to claim 7, wherein the lithium salt is any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)

$_2$NLi, chlorine borane lithium, aliphatic lower lithium carbonate, and tetra phenyl lithium borate, or mixtures thereof.

9. An anode of a cable secondary battery, comprising:
a current collector having a horizontal cross section of a predetermined shape and extending longitudinally, said current collector comprising a polymer core and a metal coating layer formed on a surface of the polymer core;
a porous shell formed by coating a surface of the current collector with an anode active material; and
a solid electrolyte layer formed by filling pores of the porous shell with a solid electrolyte,
wherein the porous shell has a pore size of 10 to 150 μm,
wherein the porous shell has a porosity more than 60% and no more than 95%, and
wherein the porous shell is formed by electroplating and the pores formed in the porous shell are adjusted according to the amount and size of hydrogen bubbles generated by the electroplating.

10. The anode of a cable secondary battery according to claim 9,
wherein the porous shell has a surface area of $8\times10^4$ to $5\times10^5$ cm$^2$/g.

11. The anode of a cable secondary battery according to claim 9,
wherein the anode active material includes any one selected from the group consisting of Si, Sn, Li, Zn, Mg, Cd, Ce, Ni, Fe and oxide thereof, or mixtures thereof.

12. A cable secondary battery comprising:
the anode defined in claim 9.

13. The anode of a cable secondary battery according to claim 9,
wherein the polymer core is formed from any one polymer selected from the group consisting of polyacetylene, polyaniline, polypyrrole, polythiophene, polysulfur nitride, polyethylene (PE), polypropylene (PP), polyvinyl chloride (PVC), polyvinyl alcohol (PVA), polyacrylate, and polytetrafluoroethylene (PTFE), or mixtures thereof.

14. The anode of a cable secondary battery according to claim 9,
wherein the metal coating layer is formed from any one metal selected from the group consisting of silver, palladium, nickel, and copper, or mixtures thereof.

15. The anode of a cable secondary battery according to claim 9,
wherein the solid electrolyte solution is formed from any one electrolyte selected from the group consisting of a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc), a solid polymer electrolyte of PEO, polypropylene oxide (PPO), polyethylene imine (PEI), polyethylene sulphide (PES), or PVAc, and a plastic crystal electrolyte of succinonitrile.

16. An anode of a cable secondary battery, comprising
a current collector having a horizontal cross section of a predetermined shape and extending longitudinally, said current collector comprising a polymer core and a metal coating layer formed on a surface of the polymer core;
a porous shell comprising an anode active material formed as a coating on a surface of the current collector, wherein the porous shell has a porosity more than 60% and no more than 95% and a surface area of $8\times10^4$ to $5\times10^5$ cm$^2$/g and wherein the porous shell comprises pores with a pore size of 10 to 150 μm; and
a solid electrolyte layer comprising a solid electrolyte formed on a surface of the porous shell, wherein the solid electrolyte is present in pores of the porous shell, and
wherein the porous shell is formed by electroplating and the pores formed in the porous shell are adjusted according to the amount and size of hydrogen bubbles generated by the electroplating.

* * * * *